UNITED STATES PATENT OFFICE.

ISAAC LIFSCHÜTZ, OF HAMBURG, GERMANY.

PROCESS OF PRODUCING HIGH-MELTING FATTY ACIDS AND HYDROPHILOUS NEUTRAL PRODUCTS FROM WOOL-FAT AND OTHER SIMILAR SUBSTANCES.

1,284,723. Specification of Letters Patent. Patented Nov. 12, 1918.

No Drawing. Application filed January 12, 1917. Serial No. 141,988.

*To all whom it may concern:*

Be it known that I, ISAAC LIFSCHÜTZ, a subject of the German Emperor, and residing at Hamburg, Germany, have invented certain new and useful Improvements in Processes of Producing High-Melting Fatty Acids and Hydrophilous Neutral Products from Wool-Fat and other Similar Substances, of which the following is a specification.

The more solid parts of wool fat have often been recommended as material for candles. However, none of the seemingly suitable products of the wool fat meets the requirements and is fit for this purpose. In the first place, the considerable formation of smoke that is observed in burning wool fat also occurs with all the solid products of wool fat heretofore used in candles. The real reason of this great formation of smoke in burning wool fat has not been heretofore discovered.

German Patent No. 167,849 shows the reasons for the great readiness of wool fat for emulsification or mixture with water. It has been proved by experiments that this property of the wool fat is not the combination of esters of the wool fat, but the free alcohols contained therein, especially the free cholesterin substances. A few per cent. of these unsaponifiable matters melted with fats or oils more suitable for an ointment base than wool fat, as, for instance, vaseline, yields an ointment base very readily emulsifiable with water or aqueous solutions. This ointment base, under the name of eucerin, has hitherto proved its value in the place of lanolin for medicinal and cosmetic purposes. In the German patent there is, furthermore, described a process of isolating the parts of the wool fat which readily mix with water. But this process is a little bothersome and is very costly if the parts which do not readily mix with water are to be completely removed. Furthermore, it is very difficult to remove by the method described in said German patent, the rather dark colored matter in the part of the wool fat which readily mixes with water, which matter is objectionable when the substance in which it is contained is used for cosmetic purposes.

In making a great number of experiments to find out the composition of the waxlike product (wool wax) described in my U. S. application Serial No. 870,042, this waxy body was found to consist on the one hand of almost equal parts of the highest melting fatty acids of the wool fat, and on the other hand of neutral substances least colored and most miscible with water.

The striking fact that of all known fat-like and wax-like substances only the wool fat burns with an intense development of smoke and soot led to the new knowledge that the true reason of this fact was the great proportion of non-saturated unsaponifiable neutral substances contained in this fatty sort of wax. In fact, it is this part of the wool fat that distinguishes it from the whole class of other fats and waxes.

This perception was verified by experiments with the material most adapted therefor, the wax of the wool fat. For instance, a candle made of the acid part of the wool wax burns with a normal steady flame without producing any smoke or soot, while a candle made of the wool wax itself burns like the wool fat with a long smoky flame.

The same experiments proved that the unsaponifiable part of the wool wax directly after its separation from the acid parts and without further purification is a very light colored soft body of high purity and readily miscible with water.

The process of separating both parts of the wool wax may be advantageously carried out as a continuation of the process of manufacturing the wool wax itself, as set forth in my application Serial No. 870,042.

*Description of process.*—The wool fat is saponified in the usual manner and then washed at ordinary temperature with alcohol, methylated spirit, acetone, or similar liquids, until a sample of the light colored pulp after being acidified yields a substance being not fatty but wax-like (wool wax.) The wax-like substance is then in any well known manner extracted to exhaustion with such solvents, (for instance, ether, carbonic sulfids or chlorids, acetone, etc.) as easily dissolve the unsaponified part of the fats, but which do not, or only in a very slight degree, dissolve the soap. The residue in the extractor which is not dissolved by the solvent can be used, as it is in the form of a soap, for many technical purposes. On being treated with acids, this soap yields the highest melting fatty acids in the form of a hard, very solid, not fatty, cake of a light brown color which, if desired, may easily and profitably be bleached. This mixture of fatty acids (hard fatty acids) melts at 77 to 80 centigrade (170 to 176 Fahrenheit). Being free from unsaponifiable matter, it has the high number of saponification of 130 to 140 and is very similar to carnauba wax. In the form of candles, in combination or not with other substances fit for the purpose, it burns with a steady normal flame without any formation of smoke or soot. This product may be technically employed in the place of hard wax for any application known for this sort of wax. If the high melting point of the fatty acids is unimportant, the quantity of fatty acids burning with a clear flame can be increased by washing the saponified wool-fat to a somewhat less degree, and until the point is reached corresponding to the particular desire.

The light colored extract of the wool wax soap, when standing at a low temperature, drops a white crystalline deposit. The clear solution drawn off therefrom yields after removing the solvent, a soft unsaponifiable mass of a dough-like kneadable consistence and of a very light yellowish color melting from about 45 to 50° centigrade (113 to 122° Fahrenheit).

A few per cent. of this soft unsaponifiable mass melted with any fat or oil confer to these a very great readiness of mixing with water. For instance, a mixture of it with vaseline, when mixed with 250 to 300% of water, produces a durable ointment quite homogeneous of a snowy whiteness and an extraordinary softness.

The crystalline substance deposited by the solution as described above is also unsaponifiable. It consists of high melting (from 65–70° C.=149–158° Fahrenheit) saturated compounds burning without smoke. If a high saponification number of the final product is of little importance, for instance, for candles, the extraction, by regulating the temperature in the extractor, can be conducted in a manner that these neutral substances remain in the residue with the soap. On the other hand, as the crystalline mass also possesses a rather great readiness for mixing with water, it may, by itself or together with the main mass of the extracted matter, be employed for the manufacturing of ointments, emulsions and the like.

The yield of the "hard fatty acids" and of the unsaponifiable part is each about 50% of the wool wax. The crystalline part of the extract constitutes about 15 to 20% of the unsaponifiable part of the wool wax and consists of high melting wool fat alcohols. This substance may, by itself or together with the main part of the unsaponifiable matter, also be employed as artificial wax.

The separating of the fatty acids from the unsaponifiable part by the extraction of the saponified wool fat with solvents is in itself known. That which was not known hitherto is the separating of the highest melting parts of the wool fat of the above described quality. Unknown until now was primarily the isolating of the waxy part burning without developing a smoking flame and the simultaneous producing in a simple way of the neutral and readily water-miscible part of the wool fat in a pure and suitable form. This unforeseen effect has been made possible only by the fact that in the manufacturing of the wool wax the soap lyes receive and remove simultaneously the low melting fatty acids and the dark colored and less water-miscible parts of the unsaponifiable substances.

What I do claim and desire to secure by United-States Patent is:

1. The herein described method which consists in saponifying or hydrolyzing wool fat, then washing the same at ordinary temperature with alcohol, for separating from the wool fat the parts soluble in the alcohol, until the residue results in a solid wax-like product, then treating the wax-like product with a suitable solvent to extract from the wax-like product the unsaponifiable part of the wool fat to obtain soaps of high melting fatty acids.

2. The herein described method which consists in saponifying or hydrolyzing wool fat, then washing the same at ordinary temperature with alcohol, for separating from the wool fat the parts soluble in the alcohol, until the residue results in a solid wax-like product, then treating the wax-like product with a suitable solvent to extract from the wax-like product the unsaponifiable part of the wool fat to obtain soaps of high melting fatty acids, and treating the soaps of the high melting fatty acids with acids to form high melting fatty acids.

3. The herein described method which consists in saponifying or hydrolyzing wool fat, then washing the same at ordinary temperature with alcohol, for separating from the wool fat the parts soluble in the alcohol, until the residue results in a solid wax-like product, then treating the wax-like product with a suitable solvent to extract from the wax-like product the unsaponifiable part of the wool fat to obtain soaps of high melting fatty acids, and treating the solvent containing the extract from the wax-like product to obtain therefrom the unsaponifiable water-miscible substance contained therein.

4. The herein described method which consists in saponifying or hydrolyzing wool fat, then washing the same at ordinary temperature with alcohol, for separating from the wool fat the parts soluble in the alcohol, until the residue results in a solid wax-like product, then treating the wax-like product with a suitable solvent to extract from the wax-like product the unsaponifiable part of the wool fat to obtain soaps of high melting fatty acids, allowing the solvent containing the extract to stand to deposit a crystalline deposit, and treating the solvent containing the extract from the wax-like product to obtain therefrom the unsaponifiable water-miscible substance contained therein.

5. As a new article of manufacture the mixture of fatty acids of wool fat relatively insoluble in alcohol, acetone or similar liquids, the same being free from unsaponifiable matter, and insoluble in solvents of the unsaponifiable matter, as ether, carbonic sulfids or chlorids, or acetone, substantially as described.

6. As a new article of manufacture the soft, unsaponifiable mass obtained from wool-fat, the same being soluble in such solvents as ether, carbon chlorids and sulfids, and acetone, and of a very light yellowish color, very miscible with water and melting from 45 to 50° centigrade (113 to 122° Fahrenheit), substantially as set forth.

In testimony whereof I have affixed my signature in the presence of two witnesses.

ISAAC LIFSCHÜTZ.

Witnesses:
 FRANCIS R. STEWART,
 LOUIS F. DILGER.